United States Patent
Horn

(10) Patent No.: US 9,223,845 B2
(45) Date of Patent: Dec. 29, 2015

(54) MOBILE HADOOP CLUSTERS

(75) Inventor: Gustav Horn, Sunnyvale, CA (US)

(73) Assignee: NetApp Inc., Sunnyvale, CA (US)

( * ) Notice: Subject to any disclaimer, the term of this patent is extended or adjusted under 35 U.S.C. 154(b) by 265 days.

(21) Appl. No.: 13/564,622

(22) Filed: Aug. 1, 2012

(65) Prior Publication Data

US 2014/0040575 A1 Feb. 6, 2014

(51) Int. Cl.
| | | |
|---|---|---|
| G06F 12/00 | (2006.01) | |
| G06F 17/30 | (2006.01) | |
| G06F 3/0484 | (2013.01) | |
| G06F 11/14 | (2006.01) | |
| G06F 3/06 | (2006.01) | |
| G06F 11/20 | (2006.01) | |

(52) U.S. Cl.
CPC ........ *G06F 17/30587* (2013.01); *G06F 3/0484* (2013.01); *G06F 3/0647* (2013.01); *G06F 3/0688* (2013.01); *G06F 11/1425* (2013.01); *G06F 11/1446* (2013.01); *G06F 11/2038* (2013.01)

(58) Field of Classification Search
None
See application file for complete search history.

(56) References Cited

U.S. PATENT DOCUMENTS

| | | |
|---|---|---|
| 2008/0243866 A1 | 10/2008 | Pandey |
| 2009/0292889 A1* | 11/2009 | Durfee .......................... 711/162 |
| 2011/0252208 A1 | 10/2011 | Ali et al. |
| 2011/0313973 A1 | 12/2011 | Srivas et al. |
| 2012/0005164 A1 | 1/2012 | Patankar et al. |
| 2012/0226391 A1* | 9/2012 | Fryer et al. ........................ 701/1 |

FOREIGN PATENT DOCUMENTS

WO    WO-2011/159842 A2    12/2011

OTHER PUBLICATIONS

International Search Report mailed Nov. 27, 2013 of PCT Application No. PCT/US2013/053239. 5 pages.
Written Opinion mailed Nov. 27, 2013 of PCT Application No. PCT/US2013/053239. 5 pages.

* cited by examiner

*Primary Examiner* — Midys Rojas
(74) *Attorney, Agent, or Firm* — Haynes and Boone LLP

(57) ABSTRACT

Techniques for mobile clusters for collecting telemetry data and processing analytic tasks, are disclosed herein. The mobile cluster includes a processor, a plurality of data nodes and an analysis module. The data nodes receive and store a snapshot of at least a portion of data stored in a main Hadoop storage cluster and real-time acquired data received from a data capturing device. The analysis module is operatively coupled to the processor to process analytic tasks based on the snapshot and the real-time acquired data when the storage cluster is not connected to the main storage cluster.

28 Claims, 8 Drawing Sheets

MOBILE HADOOP CLUSTERS

FIELD OF THE INVENTION

At least one embodiment of the present invention pertains to data-intensive clusters, and more particularly, to a mobile Hadoop cluster capable of collecting data and providing autonomous data analysis in real time.

BACKGROUND

Developments in computer and networking technology have given rise to applications that require massive amounts of data storage. For example, tens of millions of users can create web pages and upload images and text to a social media website. Consequently, a social media website can accumulate massive amounts of data each day and therefore need a highly scalable system for storing and processing data. Various tools exist to facilitate such mass data storage.

Hadoop is a popular open source framework that supports large-scale data-intensive distributed applications, by enabling applications to interact with a cluster of thousands of computers (also referred to as nodes) and petabytes of data. The Hadoop framework utilizes a distributed, scalable, portable file system, called Hadoop Distributed File System (HDFS), to distribute a massive amount of data among data nodes (also referred to as slave nodes) in a Hadoop cluster. In order to reduce the adverse impact of a data node power outage or network failure (including switch failure), data in an HDFS is typically replicated on different data nodes. The HDFS can include at least one metadata node to host a file system index.

However, in order to store the huge amount of data in the Hadoop cluster, the cluster needs a large number of nodes. The number of nodes requires a significant space to maintain the cluster. In addition, all the hardware running within the cluster consumes a significant amount of power. These factors limit the usability of a conventional Hadoop cluster.

For example, certain applications employing real-time data collection and analysis, such as signal intelligence gathering, may require both mobility and very large data storage capacity. Yet a conventional Hadoop cluster, which has very large storage capacity, is not mobile due to its size and power consumption limitations. Therefore, unless the data collection equipment for such an application has a communication link (wired or wireless) to a conventional Hadoop cluster while collecting data "in the field," which may not be practical or desirable, the application cannot take advantage of the benefits of a conventional Hadoop cluster.

SUMMARY

The technology introduced here provides the benefits of mobility along with the very high data storage capacity associated with a large scale storage cluster such as a Hadoop cluster. In particular, the technology introduced here includes a mobile data storage cluster (hereinafter "mobile cluster") and method that can be used for, among other things, collecting telemetry data and processing analytic tasks in an autonomous fashion. The mobile cluster is capable of storing a snapshot of some or all of the data of a main cluster, which can be a Hadoop cluster. The mobile cluster has a sufficiently small footprint that it can be contained within a vehicle, such as a truck. While inside of the vehicle and disconnected from the main cluster, the mobile cluster collects telemetry data from capturing devices of the vehicle and processes analytic tasks based on the snapshot and newly acquired telemetry data in real time. The mobile cluster acquires real time data and provides analytic computations in an autonomous way, without having to be connected to the main cluster while acquiring the data or performing the computations. Therefore, the mobile cluster can be used for data storage and real time analytic inquiries while collecting telemetry data in the field.

When the vehicle returns back to a depot, the mobile cluster is capable of integrating the newly acquired telemetry data into the main cluster immediately, or even integrating its own data nodes into the main cluster as a part of the main cluster.

In accordance with the techniques introduced here, therefore, a mobile cluster for collecting telemetry data and processing analytic tasks is provided. The mobile cluster in one embodiment includes a processor, a memory, a plurality of data nodes and an analysis module stored in the memory. The data nodes store a snapshot of at least a portion of the data stored in a main cluster and data acquired in real-time from a data capturing device after the snapshot has been stored. The analysis module is executable by the processor to process analytic tasks based on the snapshot and the real-time acquired data without a need to connect to the main cluster. The mobile cluster may further include an integration module shared in the memory that is executable by the processor to instantly integrate the real-time acquired data into the main Hadoop cluster when being connected to the main cluster.

Upon reintegration of the storage of the mobile cluster to the main cluster, the telemetry data and transaction information processed by the mobile cluster are seamlessly reintegrated into the main cluster without any loss of data or transaction information. In some embodiments, the storage of the mobile cluster can be removed and replaced into the main cluster.

Other aspects of the technology introduced here will be apparent from the accompanying figures and from the detailed description which follows.

BRIEF DESCRIPTION OF THE DRAWINGS

These and other objects, features and characteristics of the present invention will become more apparent to those skilled in the art from a study of the following detailed description in conjunction with the appended claims and drawings, all of which form a part of this specification. In the drawings:

DETAILED DESCRIPTION

References in this specification to "an embodiment," "one embodiment," or the like, mean that the particular feature, structure, or characteristic being described is included in at least one embodiment of the present invention. All occurrences of such phrases in this specification do not necessarily refer to the same embodiment.

The mobile Hadoop cluster disclosed herein can be utilized for real time data acquisition and analytic field studies, including applications for military defense and law enforcement. The mobile Hadoop cluster functions as a high performance Hadoop analytic cluster while still acquiring and ingesting field specific content. Upon returning to a home depot, the mobile Hadoop cluster can rapidly update its new information to the master system and refresh the main Hadoop cluster. This allows for mobile acquisition of analytic data as well as mobile autonomous Hadoop analytic processing. There are a variety of potential applications for the technique introduced here, including public sector applications such as law enforcement and Department of Defense, as well as internet companies in need of updating map data and other mobile data, such as a WiFi hot spot detection vehicle and the telemetry collection aircraft, as explained further below.

Figure 1:
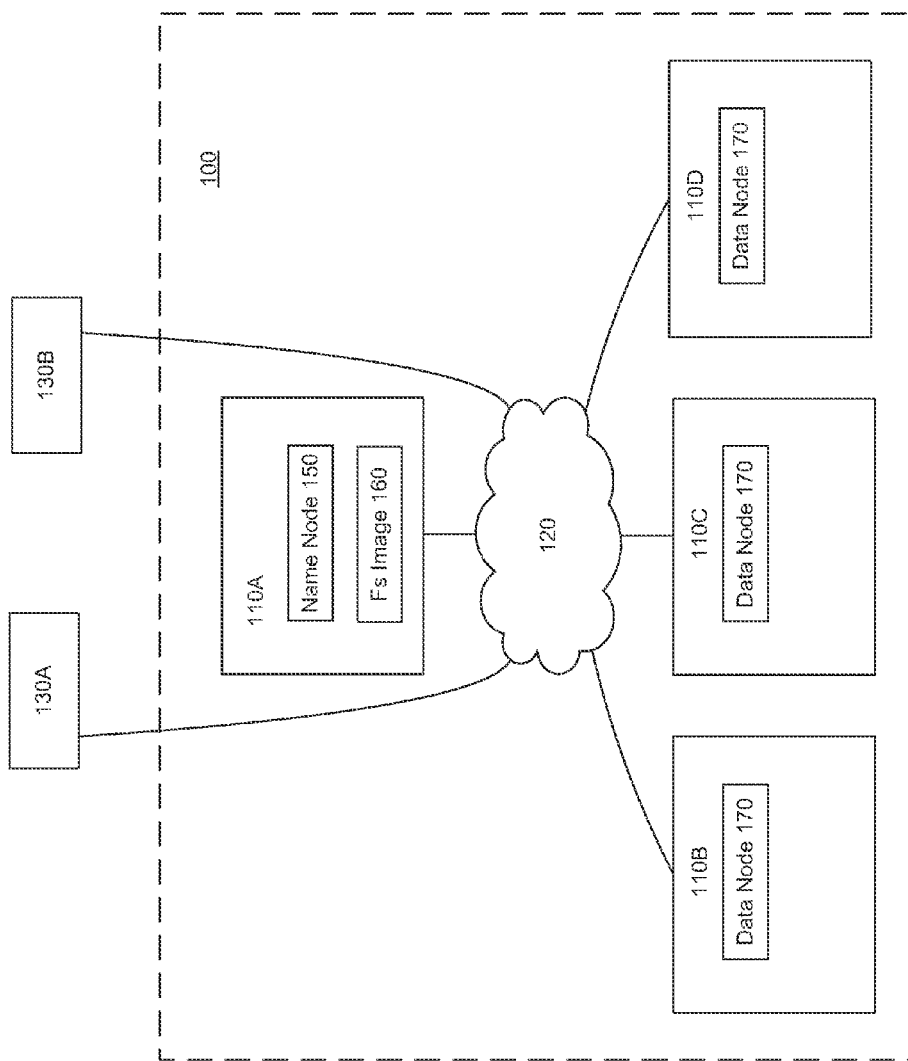
FIG. 1 illustrates an example of a Hadoop cluster including a metadata node.

FIG. 1 illustrates an example of a Hadoop cluster. In FIG. 1, the Hadoop cluster 100 includes a metadata node 110A and a plurality of data nodes 110B, 110C and 110D. The nodes can communicate with each other through an interconnect 120. The interconnect 120 may be, for example, a local area network (LAN), wide area network (WAN), metropolitan area network (MAN), global area network such as the Internet, a Fibre Channel fabric, or any combination of such interconnects. In some embodiments, the interconnect 120 can include a network switch for processing and routing data between the nodes under network protocols, including TCP/IP. Clients 130A and 130B may communicate with the Hadoop cluster 100 via a network 140, which can be, for example, the Internet, a LAN, or any other type of network or combination of networks. Each of the clients may be, for example, a conventional personal computer (PC), server-class computer, workstation, handheld computing/communication device, or the like. In some embodiments, the Hadoop cluster is implemented using one or more racks of commodity-class servers.

Files and data are stored in a distributed manner across the nodes in the Hadoop cluster 100 in a Hadoop Distributed File System (HDFS). To the clients of the cluster 100, including clients 130A and 130B, the HDFS serves functions of a conventional hierarchical file system. Files and data blocks of files can be created, deleted, or moved in the HDFS. There is a NameNode service 150 running on the metadata node 110A to provide metadata services within HDFS, including maintaining the file system namespace and controlling access by external clients. The NameNode service can store the file system index, including the mapping of blocks to files and file system properties, in a file 160 called FsImage in the metadata node. In some embodiments, there may be a secondary metadata node running a secondary NameNode service. The secondary metadata node serves as a backup in case the metadata node fails.

Each data node 110 is responsible for storing files for the HDFS. Files stored in the HDFS are divided into subsets, referred to herein as "blocks". In one embodiment, the size of a block is 64 MBs. The blocks are typically replicated to multiple data nodes. Therefore, the HDFS in the Hadoop cluster 100 can, but does not necessarily, use a conventional RAID architecture to achieve data reliability. File operations are controlled by the NameNode service 150 running on the metadata node 110A. In some embodiments, data nodes 110B, 110C, 110D are organized into racks where all nodes are connected via a network switch. The network speed between nodes within a rack can be faster than the network speed between nodes in different racks. The Hadoop cluster may take that fact into account when assigning tasks. A DataNode service 170 runs on each data node for responding read and write requests for blocks. The DataNode services 170 also respond to requests from the metadata node for creating, deleting and replicating blocks.

In some embodiments, the data nodes 110B, 110C, 110D send periodic heartbeat messages including block reports to the metadata node 110A. The metadata node 110A validates its block mapping and other file system metadata using the periodic block reports.

When a client 130A or 130B seeks to write a file to the Hadoop cluster 100, the client sends a file creation request to the metadata node 110A. The metadata node 110A responds to the client with the identity of one or more assigned data node(s) and the destination locations of the blocks of the files. The client sends data blocks of the file to the assigned data node(s); and the cluster can replicate the data blocks on one or more data nodes. Once all blocks are sent, the metadata node records the file creation in its metadata, including the FsImage file.

Figure 2:
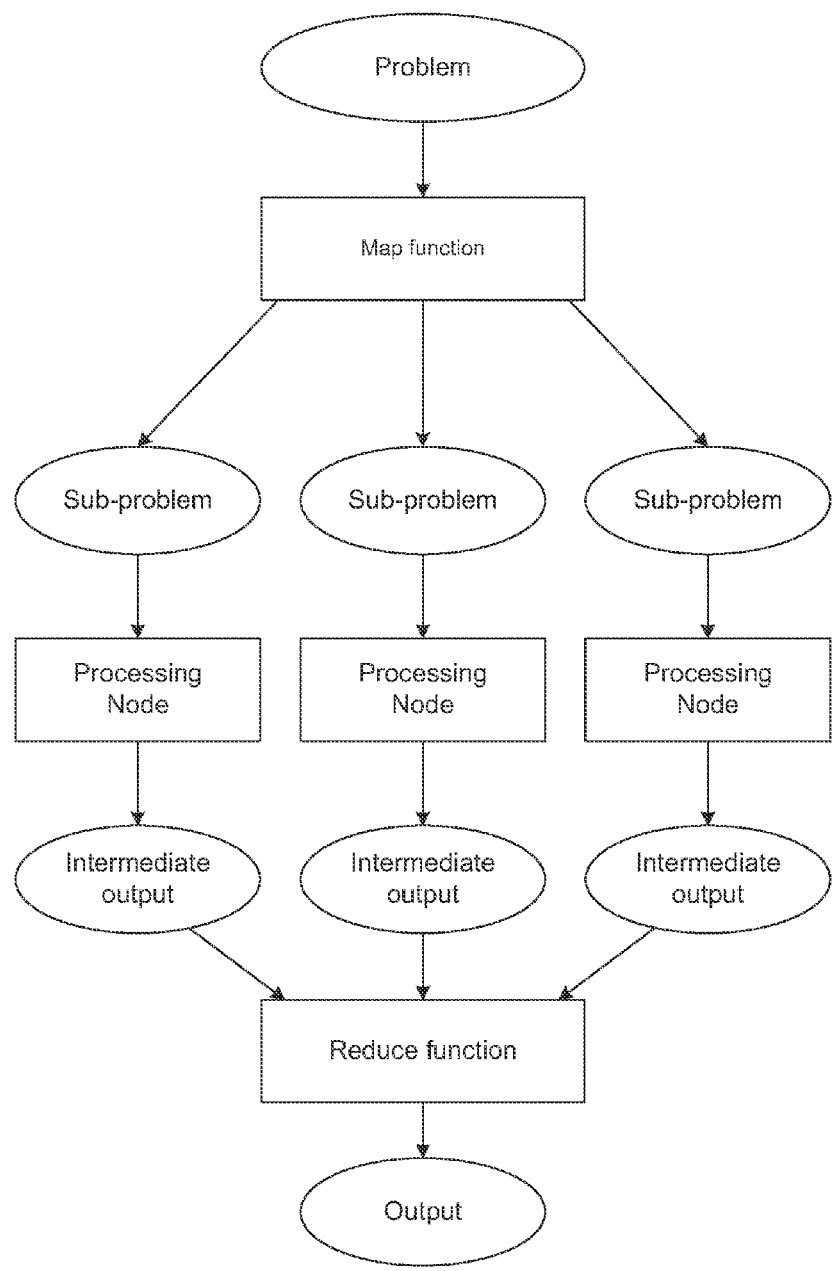
FIG. 2 illustrates an example of a process according to a MapReduce framework of a Hadoop cluster.

A Hadoop cluster works as a parallel data processing engine based on a framework called MapReduce. A MapReduce framework divides a problem into multiple sub-problems, receives intermediate outputs by solving these sub-problems, and combines the intermediate outputs into an output for the problem. A MapReduce application written based on the MapReduce framework can contain at least three elements: a map function, a reduce function and a main function that combines job control and file input/output. Hadoop architecture provides interfaces for a MapReduce application to run on a Hadoop cluster. FIG. 2 illustrates an example of a process according to the MapReduce framework of a Hadoop cluster. As illustrated in FIG. 2, the map function takes a problem for a set of data (typically a large set of data) and divides the problem into smaller sub-problems for smaller sub-set of data. An example application of MapReduce is a process of counting appearances of each different word in a set of documents. Each sub-problem can be responsible for counting appearances of one word in one document.

The sub-problems are distributed to nodes within the Hadoop cluster for processing. After the processing, the answers to the sub-problems (intermediate outputs) are collected and combined by the reduce function to form the output, i.e. the answer to the problem that was originally trying to solve. In the previous example of counting word appearances, the reduce function collects the intermediate outputs of word appearances in each document, and sum the intermediate outputs to find the total appearances of each word in the set of documents.

Figure 3:
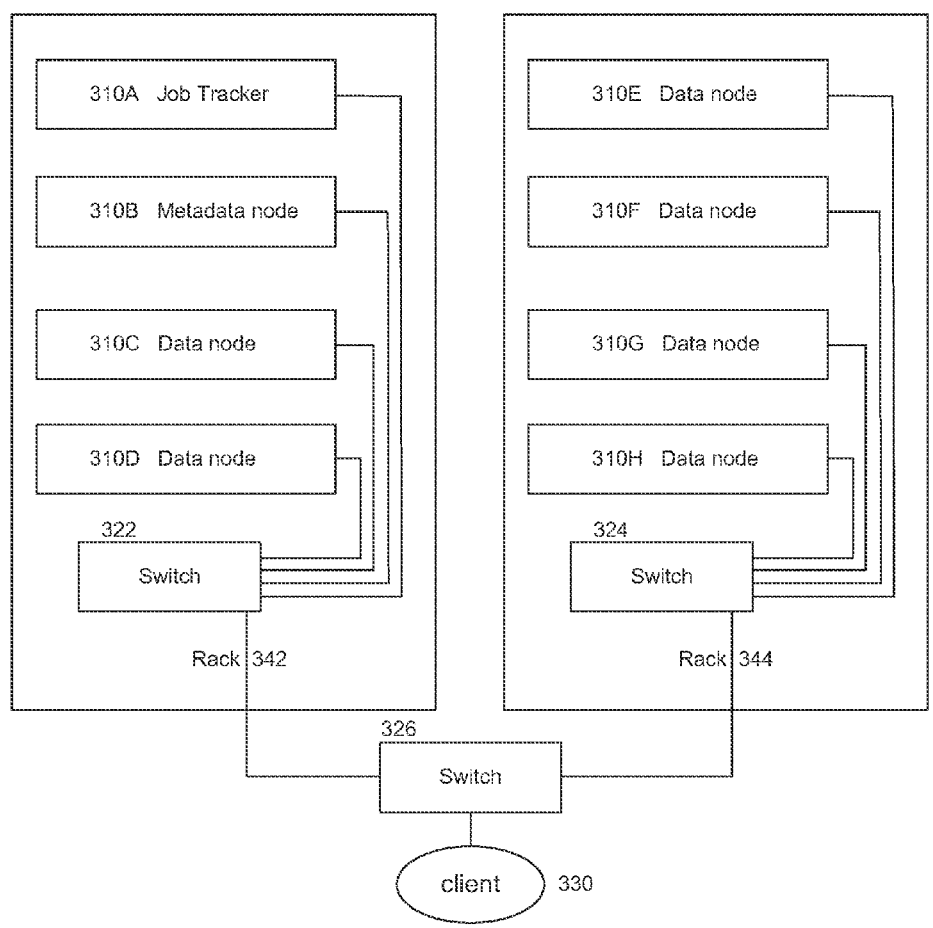
FIG. 3 illustrates an example of a Hadoop cluster having a JobTracker managing a MapReduce task.

The Hadoop cluster includes a JobTracker to implement the MapReduce function. As illustrated in FIG. 3, a JobTracker can be implemented as a dedicated server (JobTracker node 310A) within a Hadoop cluster 300. The Hadoop cluster 300 includes two racks 342 and 344 interconnected via a switch 326. Rack 342 includes JobTracker node 310A, metadata node 310B, data nodes 310C-310D and a switch 322 to interconnect the nodes within rack 342. Rack 344 includes data nodes 310E-310H and a switch 324 to interconnect the nodes within rack 342. In some other embodiments, a JobTracker can be implemented as a service that shares the same metadata node with a NameNode service. The JobTracker node 310A, which is dedicated to control MapReduce jobs, receives a request from a client 330 to launch a MapReduce job. Once the MapReduce job (also referred to as a MapReduce application or a MapReduce task) is submitted to the JobTracker 310A, JobTracker 310A identifies input and output files and/or directories in the HDFS for the job. The input file for the MapReduce task can include a plurality of input file blocks that contain input data for the MapReduce task. The JobTracker 310A uses knowledge of the input file blocks (including physical quantity of blocks and where the blocks are located) to decide how many subordinate tasks will be created. The MapReduce application is copied to every processing node where the input file blocks are present. For each assigned processing node, JobTracker 310A creates at least one subordinate task. On each assigned processing node, a TaskTracker service monitors the status of the subordinate task on that node and reports the status and intermediate output back to the JobTracker. The Hadoop cluster 300 distributes the subordinate tasks based on the knowledge of the file blocks. Therefore, instead of moving storage to the processing locations, a Hadoop cluster moves the processing tasks to the storage locations. This enables efficient processing of the data by scaling the processing with the number of nodes within the cluster.

Although the nodes 310A-310H are illustrated as single units in FIG. 3, each node can have a distributed architecture. For example, a node can be designed as a combination of a network module (e.g., "N-blade") and disk module (e.g., "D-blade") (not shown), which may be physically separate from each other and which may communicate with each other over a physical interconnect. Such an architecture allows convenient scaling, such as by deploying two or more N-modules and D-modules, all capable of communicating with each other through the interconnect.

Figure 4:
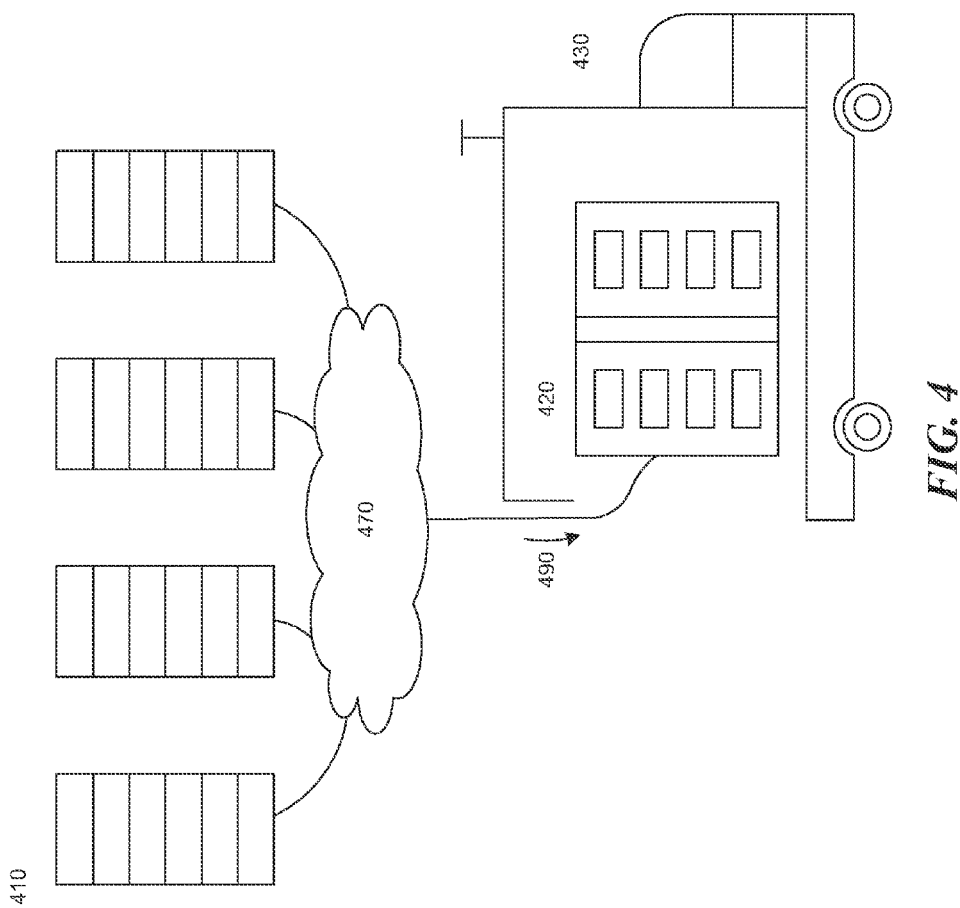
FIG. 4 illustrates an example of a mobile Hadoop cluster connecting to a main Hadoop cluster.

In accordance with the technique introduced here, to achieve a small footprint for mobility while still retaining data storage and analytic processing abilities, a mobile Hadoop cluster is provided. FIG. 4 illustrates an example of a mobile Hadoop cluster receiving a snapshot 490 from a main Hadoop cluster. In FIG. 4, the main Hadoop cluster 410 is a large cluster for storing a large amount of data, for instance, more than one petabyte (PB) of data. The data stored in the main Hadoop cluster 410 in one illustrative embodiment is used for analytic inquires (also referred to as analytic tasks). For example, an analytic task can be a request to identify a particular person based on the existing data, or a request to calculate a next route. Mobile Hadoop cluster 420 is a Hadoop cluster that has a much smaller footprint than the main Hadoop cluster 410 in terms of the number of physical nodes and the overall physical space that it occupies. For example, a main cluster may have 100 nodes occupying 20 racks, while a mobile cluster may only have 10 nodes occupying 2 racks. The mobile Hadoop cluster 420 can be installed in a vehicle 430. In one embodiment, the mobile Hadoop cluster 420 is connected with the main Hadoop cluster 410 via an interconnect 470. For example, the interconnect 470 can be a Gigabit Ethernet or other high speed local area networks (LANs). The vehicle 430 can be a land vehicle, an aircraft, a train, a watercraft, a submarine, a spacecraft or any other kind of vehicle. The vehicle 430 can be manned or unmanned.

When the mobile Hadoop cluster 420 is connected to the main Hadoop cluster 410, a snapshot 490 of the data store in the main Hadoop cluster 410 is generated and migrated into the mobile Hadoop cluster 420 via the interconnect 470. A "snapshot" is a point-in-time image of a set of data. In some other embodiments, the mobile cluster 420 has an architecture other than a Hadoop architecture.

In some embodiments, when the mobile Hadoop cluster 420 is connected to the main Hadoop cluster 410, the mobile Hadoop cluster 420 couples to the main Hadoop cluster 410 as a backup cluster of the main Hadoop cluster 410. A snapshot 490 of the file system metadata of the main cluster 410, including the FsImage file, is copied to the metadata node of the mobile Hadoop cluster 420. Data blocks are copied to the data nodes of the mobile Hadoop cluster 420. After the data blocks and metadata are copied to the mobile Hadoop cluster 420, the mobile Hadoop cluster 420 is ready to be disconnected from the main Hadoop cluster 410, the mobile Hadoop cluster 420 contains a snapshot 490 of the data stored in the main Hadoop cluster 410. The snapshot process illustrated in FIG. 4 can happen at a central base, a depot, or a place near the main cluster for a fast connection between the mobile and main clusters.

In one embodiment, a mobile Hadoop cluster is much smaller than a main Hadoop cluster. The mobile Hadoop cluster can still hold a snapshot of the data stored in the main Hadoop cluster partially because the mobile Hadoop cluster uses a smaller data replication factor, or even no data replication.

Figure 5:
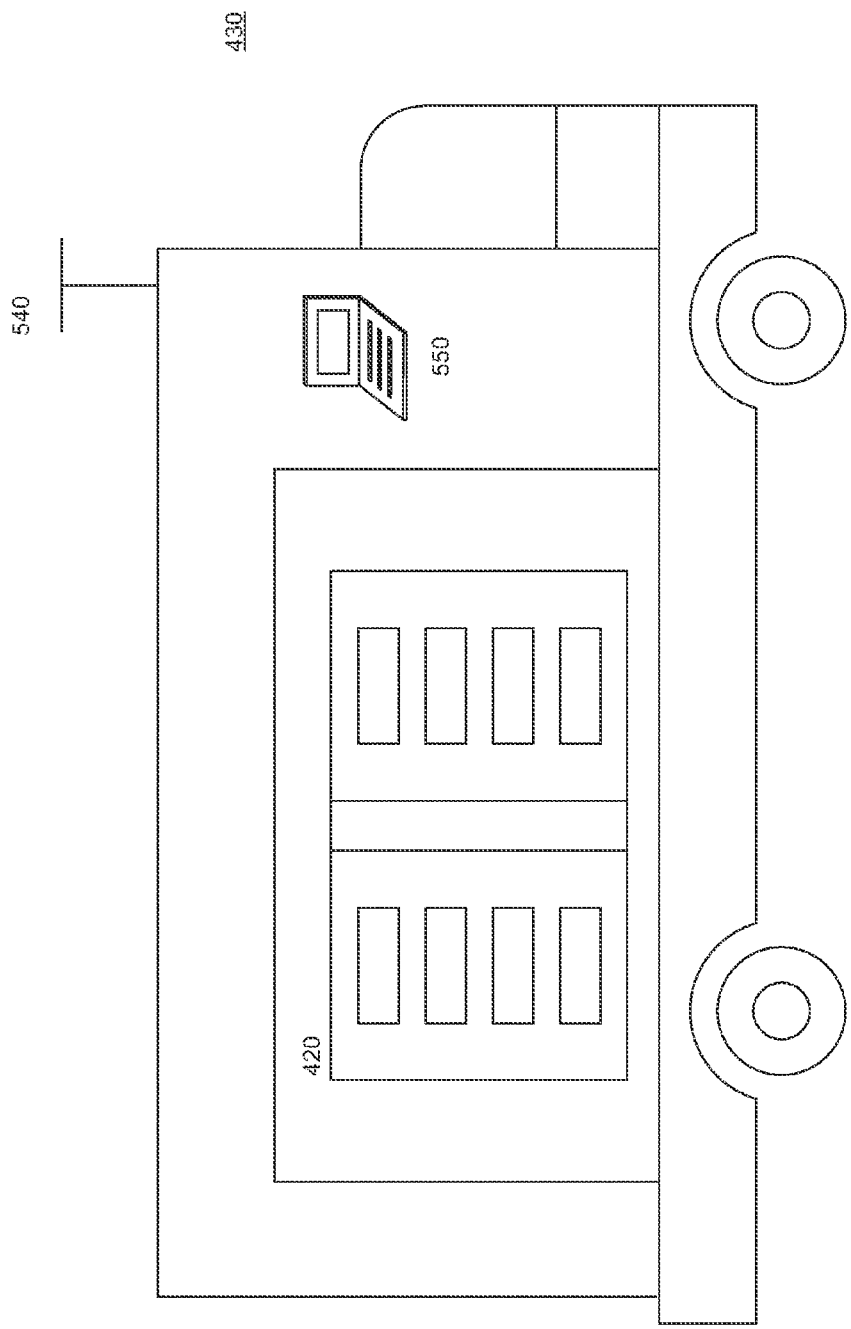
FIG. 5 illustrates an example of a mobile Hadoop cluster disposed in a vehicle disconnected from the main cluster.

FIG. 5 illustrates an example of a vehicle carrying a mobile Hadoop cluster "in the field", i.e., disconnected from the main cluster 410. The vehicle 430 moves in the field and collects telemetry data from its telemetry data capturing device(s) 540. The telemetry data can include wireless radio signals, cellular phone signals, wireless network signals, video signals, audio signals, photos, location information, telecommand information or other telemetry data can be captured in the field. The telemetry data capturing device(s) 540 may include a camera (still and/or video) or other type of image sensor, microphone, antenna, signal sensor, signal processing devices and/or other data capturing elements. In some embodiments, the vehicle 430 can include more than one telemetry data capturing device. The telemetry data are acquired and stored in the mobile Hadoop cluster 420. Further, while in the field, the vehicle 430 and the mobile Hadoop cluster 420 do not have any physical connection to the main Hadoop cluster and need not have any type of connection (including wireless) to the main wireless cluster. The mobile Hadoop cluster 420 storing the snapshot data from the main Hadoop cluster serves as an autonomous cluster for real time analytics. One or more client devices 550 in the vehicle 430 are connected to the mobile Hadoop cluster 420 to input analytic tasks into the cluster in real time when the vehicle 430 is in the field. The mobile Hadoop cluster 420 processes the analytic tasks based on the snapshot data and/or newly acquired telemetry data, and provides the analytic results to the client device 550. The client devices can be operated by human operators or operated automatically. In one embodiment, the client devices can be computers connected to the mobile Hadoop cluster in a SAN or NAS network in the vehicle.

For instance, the vehicle 430 can be a car or truck (or a military vehicle such as a Mine Resistant Ambush Protected vehicle) driving around a city district. The car can have a camera that captures street photos, a wireless receiver that detects WiFi hot spots, and a GPS receiver that determines the location of the vehicle. The telemetry data such as street photos, WiFi hot spots information and GPS coordinates are stored in real time into the HDFS file system of the mobile Hadoop cluster. Besides the newly acquired telemetry information, the mobile Hadoop cluster in the vehicle 430 has a snapshot data of a main Hadoop cluster. The snapshot data contains telemetry data for some of the streets in the city district that has been collected previously. In one example, by using the previously-loaded snapshot data and the newly acquired telemetry data, a client computer 550 in the vehicle 430 can request the mobile Hadoop cluster 420 to process an analytic task of an optimal route for the vehicle 430 for detecting more WiFi hot spots. The optimal route can be determined in real time by the history data of WiFi hot spots and street photos. For instance, a fast changing street (based on the photo analysis) with new buildings may have a better possibility of detecting new WiFi hot spots; or photo recognition may identify certain places (e.g. malls, cafeteria, transportation stations) that may have WiFi hot spots. Therefore, the mobile Hadoop cluster serves as an autonomous analytic server for analyzing the stored data and processing analytic tasks for the client device(s) in the vehicle in the field, while there is no need and/or feasibility to connect to the main Hadoop cluster.

In another example, the vehicle containing the mobile Hadoop cluster can be an aircraft, such as an unmanned aerial vehicle (UAV), collecting telemetry data such as cell phone signals and video signals. The data in the mobile Hadoop cluster can include a huge amount unstructured data, i.e. data that does not fit well into relational tables or pre-defined data models. The mobile Hadoop cluster in the aircraft stores the newly acquired telemetry data and compares the new data with the data base in the snapshot. If, for example, a particular voice pattern and a facial pattern of a target are identified based on the comparison, the aircraft can send an alert to a human operator or perform some other programmed action. The mobile Hadoop cluster in the aircraft serves as an autonomous analytic server for processing analytic tasks including voice and facial recognition in the field.

In some embodiments, the main Hadoop cluster can contain telemetry data applicable to a large geographic region, such as an entire country; whereas the snapshot on the mobile Hadoop cluster only needs to contain the (portion of the data for the) particular region to which the vehicle containing it is assigned (e.g., a particular city).

Figure 6:
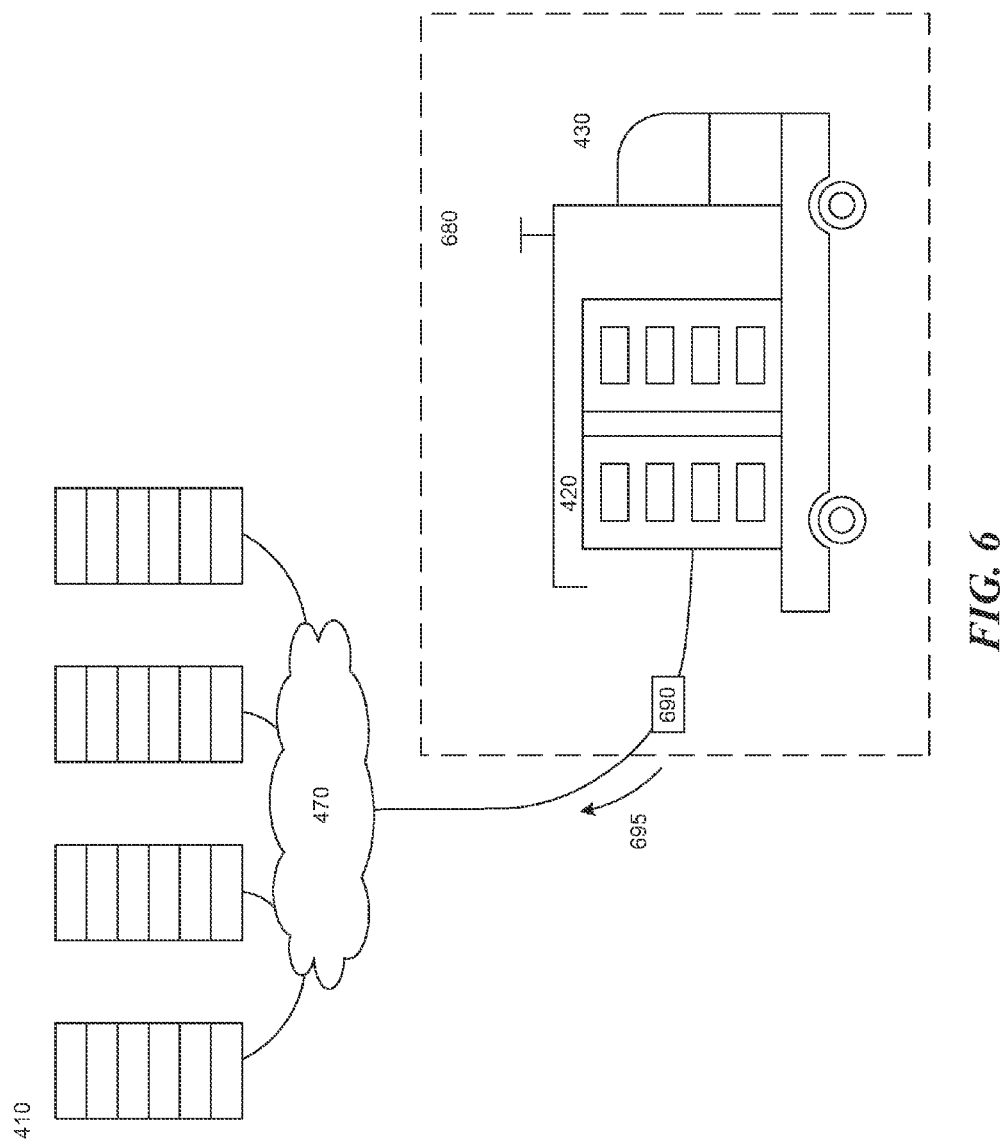
FIG. 6 illustrates an example of a mobile Hadoop cluster returning with a vehicle to a depot.

FIG. 6 illustrates an example of a vehicle carrying a mobile Hadoop cluster back from the field into a depot. The mobile Hadoop cluster 420 has been gathering and storing the newly acquired telemetry data while the vehicle 430 is in the field. Eventually the vehicle 430 carrying the mobile Hadoop cluster 420 returns to a depot 680. The depot 680 has a connection 690 to the main Hadoop cluster 410. For example, the connection 690 can be a high speed Ethernet connection routed by a Gigabyte switch. Thus, when the vehicle 430 is back in the depot 680, the mobile Hadoop cluster is connected to the main Hadoop cluster 410 via the connection 690. Once the mobile Hadoop cluster establishes a connection, the mobile Hadoop cluster transfers the newly acquired telemetry data 695 to the main Hadoop cluster 410 via the connection 690 and interconnect 470. In addition, the data on the main Hadoop cluster 410 may have been updated while the vehicle is on the field. The main Hadoop cluster 410 can transfer the changes to the data on the main Hadoop cluster 410 since the last time cluster 410 was connected to the mobile Hadoop cluster 420. Therefore, the mobile Hadoop cluster 420 rapidly offloads and refreshes data while the vehicle 430 is in the depot 680. In another embodiment, the main Hadoop cluster 410 can transfer the actual data as modified on the main cluster since the last time cluster 410 was connected to the mobile Hadoop cluster 420.

In one embodiment, The FsImage of the mobile Hadoop cluster will be integrated into the main Hadoop cluster in a substantially instant fashion, once the mobile system is brought on-line in the main cluster, as described further below. All new data and processed information are synchronized.

In some embodiments, in addition to the newly acquired telemetry data, the information generated from the real-time analysis of the mobile Hadoop cluster is transferred to the main mobile Hadoop cluster. In the above-described example of WiFi spot detection, the mobile Hadoop cluster in the vehicle can analyze the data and generate a list of possible places for finding WiFi hotspots in real time. This list of possible places can be transferred back to the main Hadoop to be used for future exploration. In the previous above-described example of an aircraft, the mobile Hadoop cluster in the aircraft can store recognized identities of certain individuals and the location and time when the individuals are derailed. That information can be transferred back to the main Hadoop cluster as, for example, entries of a database for identified individuals.

In some embodiments, the nodes in the mobile Hadoop cluster 420 are modular components (e.g. server "blades") that are built from commodity hardware. The data nodes in the mobile Hadoop cluster 420 can be easily removed from a rack of the cluster 420 and then placed in a rack as a part of the main Hadoop cluster 410. Then the main Hadoop cluster 410 recognizes the newly placed data nodes and starts to replicate the blocks from newly placed nodes if necessary. The differences of the file system metadata between the main and mobile Hadoop cluster will be applied to update the file system of the main Hadoop cluster. The ingestion of the new data is instant, because the new data has been already stored in the data nodes that are now a part of the main Hadoop cluster. Upon receiving an integrating command, the main Hadoop cluster is instantly aware of the new data. The integrating command updates the metadata maintained by the NameNode service to reflect the integration of the new data and/or modified data.

Typically data blocks on the main Hadoop cluster are replicated by a factor of at least three, i.e., two copies are created for each stored data block. To maintain the mobile Hadoop cluster's small footprint, the blocks on the mobile Hadoop cluster can be replicated by a factor smaller than the factor of the main Hadoop cluster replication. In some embodiments, the replication factor on mobile Hadoop cluster is one (i.e. no block replication). In some embodiments, the replication factor on a Hadoop cluster is two, i.e. one copy is created for each stored data block. In some embodiments, the data on the mobile Hadoop cluster can be protected by other redundancy architectures including RAID.

In some embodiments, in order to achieve a small footprint, the mobile Hadoop cluster has less processor (CPU) power than the main Hadoop cluster. While the mobile cluster may be responsible for performing some real-time analytics in the field, other analytics that are more computationally intensive can be done in the main Hadoop cluster.

In some embodiments, the storage devices (e.g. storage disks or non-volatile solid state memory such as flash) of the mobile Hadoop cluster are connected to the CPUs via Serial Attached SCSI (SAS) to achieve fast communication between the storage units and CPUs, while the storage units can be detached from the mobile Hadoop cluster and be inserted in a rack of the main Hadoop cluster. When the vehicle returns to the depot, the storage units can be detached from the mobile Hadoop cluster (and the vehicle), and then be inserted into and be a part of the main Hadoop cluster.

Figure 7:
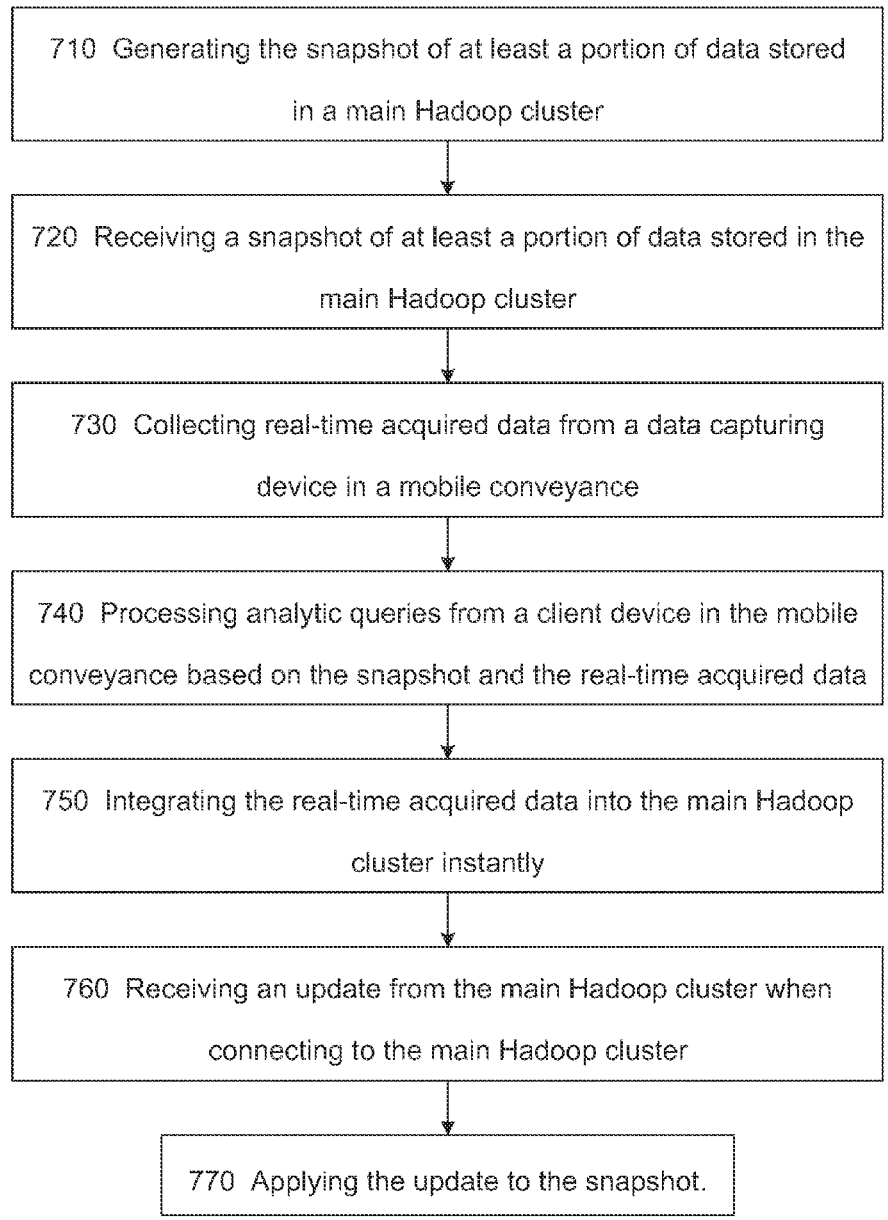
FIG. 7 illustrates an example of a process of a Hadoop cluster interacting with a main Hadoop cluster and a vehicle before, during, and after field use.

FIG. 7 illustrates an example process of a mobile Hadoop cluster interacting with a main Hadoop cluster and a vehicle before, during, and after field use. At 710, the main Hadoop cluster or the mobile Hadoop cluster generates a snapshot of at least a portion of data stored in the main Hadoop cluster. Then the snapshot is transferred to the mobile Hadoop cluster (720). Once the vehicle carrying the mobile Hadoop cluster drives off, at 730, the mobile Hadoop cluster starts collecting real-time acquired data from a data capturing device in a vehicle. While collecting the real-time data, the mobile Hadoop cluster may process analytic queries from one or more client devices in the vehicle; the analysis performed by the mobile cluster in response to such queries is based on the snapshot and the real-time acquired data (740). For example, the analysis performed can be voice or facial recognition in the example of a telemetry collecting aircraft.

When the vehicle returns to a depot (750), the mobile Hadoop cluster is connected to the main Hadoop cluster via a connection, and the real-time acquired data is integrated into the main Hadoop cluster with minimal delay or essentially instantly. In one embodiment, the mobile Hadoop cluster only moves the data blocks and associated metadata for the real-time acquired data to a corresponding data node within the main Hadoop cluster. Once the mobile Hadoop cluster has moved the data blocks for the real-time acquired data, the main Hadoop cluster may initiate a process for replicating the newly removed data blocks based on the predetermined replication factor of the main Hadoop cluster. In some other embodiments, instead of connecting the mobile and main Hadoop clusters with a connection, the data nodes or the storage units storing the real-time acquired data are physically removed from their mounting locations in the mobile Hadoop cluster and integrated into mounting locations in the main Hadoop cluster. Further, at 760 of the example process, an update from the main Hadoop cluster is transferred to the mobile Hadoop cluster, wherein the update includes changes of the data stored in the main Hadoop cluster since last time of connecting to the main Hadoop cluster. The update is applied to the snapshot stored in the mobile Hadoop cluster (770).

Figure 8:
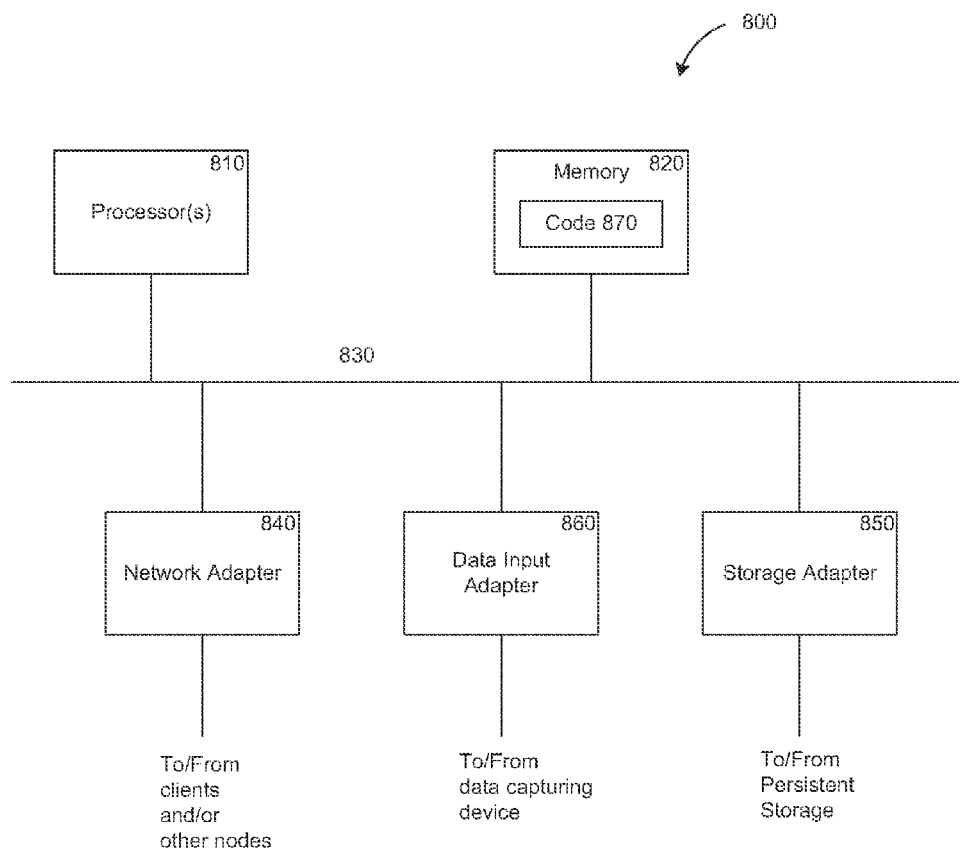
FIG. 8 is a high-level block diagram showing an example of the architecture of a node of a Hadoop cluster.

FIG. 8 is a high-level block diagram showing an example of the architecture of a node 800, which may represent any of nodes 110A-110D or 310A-310H. The node 800 includes one or more processors 810 and memory 820 coupled to an interconnect 830. The interconnect 830 shown in FIG. 8 is an abstraction that represents any one or more separate physical buses, point to point connections, or both connected by appropriate bridges, adapters, or controllers. The interconnect 830, therefore, may include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called "Firewire".

The processor(s) 810 is/are the central processing unit (CPU) of the storage controller 800 and, thus, control the overall operation of the node 800. In certain embodiments, the processor(s) 810 accomplish this by executing software or firmware stored in memory 820. The processor(s) 810 may be, or may include, one or more programmable general-purpose or special-purpose microprocessors, digital signal processors (DSPs), programmable controllers, application specific integrated circuits (ASICs), programmable logic devices (PLDs), trusted platform modules (TPMs), or the like, or a combination of such devices.

The memory 820 is or includes the main memory of the node 800. The memory 820 represents any form of random access memory (RAM), read-only memory (ROM), flash memory, or the like, or a combination of such devices. In use, the memory 820 may contain, among other things, code 870 embodying at least a portion of a storage operating system of the node 800. Code 870 may also include a snapshot module stored in the memory that is executable by the processor to generate a snapshot of at least a portion of the data stored in the data nodes, an analysis module stored in the memory that is executable by the processor to process analytic tasks based on the snapshot and real-time acquired data without a need to connect to a main Hadoop cluster, and/or an integration module stored in the memory that is executable by the processor to virtually instantly integrate real-time acquired data into a main Hadoop cluster.

Also connected to the processor(s) 810 through the interconnect 830 are a network adapter 840 and a storage adapter 850. The network adapter 840 provides the node 800 with the ability to communicate with mobile devices, such as clients 130A or 130B, over a network and may be, for example, an Ethernet adapter or Fibre Channel adapter. The network adapter 840 may also provide the node 800 with the ability to communicate with other nodes within the data storage cluster. In some embodiments, a node may use more than one network adapter to deal with the communications within and outside of the data storage cluster separately. The storage adapter 850 allows the node 800 to access a persistent storage, and may be, for example, a Fibre Channel adapter or SCSI adapter. Node 800 can further includes a data input adapter 860 for receiving acquired data from a data capturing device on or in a vehicle.

The code 870 stored in memory 820 may be implemented as software and/or firmware to program the processor(s) 810 to carry out actions described below. In certain embodiments, such software or firmware may be initially provided to the node 800 by downloading it from a mobile system through the node 800 (e.g., via network adapter 840).

The techniques introduced herein can be implemented by, for example, programmable circuitry (e.g., one or more microprocessors) programmed with software and/or firmware, or entirely in special-purpose hardwired circuitry, or in a combination of such forms. Special-purpose hardwired circuitry may be in the form of, for example, one or more application-specific integrated circuits (ASICs), programmable logic devices (PLDs), field-programmable gate arrays (FPGAs), etc.

Software or firmware for use in implementing the techniques introduced here may be stored on a machine-readable storage medium and may be executed by one or more general-purpose or special-purpose programmable microprocessors. A "machine-readable storage medium", as the term is used herein, includes any mechanism that can store information in a form accessible by a machine (a machine may be, for example, a computer, network device, cellular phone, personal digital assistant (PDA), manufacturing tool, any device with one or more processors, etc.). For example, a machine-accessible storage medium includes recordable/non-recordable media (e.g., read-only memory (ROM); random access memory (RAM); magnetic disk storage media; optical storage media; flash memory devices; etc.), etc.

The term "logic", as used herein, can include, for example, programmable circuitry programmed with specific software and/or firmware, special-purpose hardwired circuitry, or a combination thereof.

In addition to the above mentioned examples, various other modifications and alterations of the invention may be made without departing from the invention. Accordingly, the above disclosure is not to be considered as limiting and the appended claims are to be interpreted as encompassing the true spirit and the entire scope of the invention.

What is claimed is:

1. A storage cluster, comprising:
   a processor;
   a plurality of data nodes for receiving and storing a point-in-time image of at least a portion of data stored in a main storage cluster, that is separate from the storage cluster, and acquired data received from a data capturing device; and an analysis module operatively coupled to the processor to process analytic tasks based on the point-in-time image and the acquired data when the storage cluster is not connected to the main storage cluster for exchanging data;

wherein the data nodes of the storage cluster are removable from the storage cluster and configured to be integrated into the main storage cluster, and in an event that the data nodes are integrated into the main storage cluster, the main storage cluster uses differences of file system metadata between the storage cluster and the main storage cluster to update a file system of the main storage cluster.

2. The storage cluster of claim 1, further comprising:
a connection; and
an integration module to integrate the acquired data into the main storage cluster via the connection.

3. The storage cluster of claim 1, wherein the storage cluster is disposed in a vehicle, and the data capturing device is disposed in or on the vehicle.

4. The storage cluster of claim 3, wherein the analysis module is configured to process analytic tasks from a client device within the vehicle based on the point-in-time image and the acquired data without being connected to the main storage cluster.

5. The storage cluster of claim 1, further comprising:
a connection to retrieve incoming data from the main storage cluster; and
a point-in-time image module to generate the point-in-time image of at least the portion of the data store in the main storage cluster based on the incoming data.

6. The storage cluster of claim 5, wherein, when the storage cluster is connected to the main storage cluster via the connection, the point-in-time image module is configured to further receive an update via the connection from the main storage cluster and to apply the update to the point-in-time image; and wherein the update includes changes of the data stored in the main storage cluster since a last time the storage cluster was connected to the main storage cluster.

7. The storage cluster of claim 1, wherein the acquired data includes telemetry data, and the data capturing device comprises a telemetry data collecting device.

8. The storage cluster of claim 1, wherein the storage cluster is a Hadoop storage cluster, which is separated from the main storage cluster when the storage cluster receives the acquired data.

9. The storage cluster of claim 1, wherein the main storage cluster is a Hadoop storage cluster.

10. A computational cluster for analyzing unstructured data, comprising:
a processor;
a plurality of data nodes for storing unstructured data;
a point-in-time image module operatively coupled to the processor to generate a point-in-time image of at least a portion of the unstructured data stored in the data nodes;
a connection configured to transfer the point-in-time image to a mobile cluster; and
an integration module stored in a memory of the computational cluster that is executable by the processor to instantly integrate real-time acquired data from the mobile cluster into the computational cluster via the connection, when the mobile cluster is connected to the computational cluster via the connection;
wherein integration module is further configured to use differences of file system metadata between the computational cluster and the mobile cluster to update a file system of the computational cluster.

11. The computational cluster of claim 10, wherein the real-time acquired data is telemetry data collected into the mobile cluster by a telemetry data collecting device when the mobile cluster is not connected to the computational cluster.

12. The computational cluster of claim 10, wherein the mobile cluster is disposed in a vehicle when the mobile cluster is not connected to the computational cluster, and the real-time acquired data is received from a data capturing device within the vehicle.

13. The computational cluster of claim 10, wherein the point-in-time image enables the mobile cluster to process analytic tasks based on the point-in-time image without a need to connect to the computational cluster.

14. The computational cluster of claim 10, wherein the computational cluster is configured to integrate a plurality of mobile data nodes removable from the mobile cluster.

15. The computational cluster of claim 10, wherein, when the mobile cluster is connected to the main computational cluster via the connection, the point-in-time image module is executable by the processor to further generate an update of the unstructured data and transmit the update via the connection to the mobile cluster; and wherein the update includes changes of the data stored in the computational cluster since last time the mobile cluster was connected to the computational cluster.

16. The computational cluster of claim 10, wherein the computational cluster is a Hadoop cluster.

17. A computer implemented method, comprising:
receiving, at a mobile storage cluster, a point-in-time image of at least a portion of data stored in a main storage cluster;
collecting, at the mobile storage cluster, real-time acquired data from a data capturing device;
processing analytic tasks in the mobile storage cluster based on the point-in-time image and the real-time acquired data when the mobile storage cluster is not connected to the main storage cluster;
removing data nodes storing the real-time acquired data from the mobile storage cluster;
integrating the data nodes into the main storage cluster; and
using differences of file system metadata between the mobile storage cluster and the main storage cluster to update a file system of the main storage cluster.

18. The method of claim 17, further comprising:
integrating the real-time acquired data into the main storage cluster instantly via a connection when the mobile storage cluster is connected to the main storage cluster.

19. The method of claim 17, wherein said collecting real-time acquired data comprises:
collecting real-time acquired data from a data capturing device disposed in or on a vehicle.

20. The method of claim 17, wherein said processing analytic tasks comprises:
processing analytic tasks from a client device in the mobile storage cluster based on the point-in-time image and the real-time acquired data when the mobile storage cluster is not connected to the main storage cluster, when the device and the mobile storage cluster are disposed in a vehicle.

21. The method of claim 17, further comprising:
generating the point-in-time image of at least the portion of data stored in the main storage cluster.

22. The method of claim 17, wherein the real-time acquired data is telemetry data, and the data capturing device is a telemetry data collecting device.

23. The method of claim 17, further comprising:
receiving an update from the main storage cluster when the mobile storage cluster is connected to the main storage cluster, wherein the update includes changes of the data stored in the main storage cluster since a last time when the mobile storage cluster was connected to the main storage cluster; and
applying the update to the point-in-time image stored in the mobile storage cluster.

24. The method of claim 17, wherein the main storage cluster is a Hadoop storage cluster.

25. A data storage node, comprising:
a processor;
a connection interface through which to contact one or more other data storage nodes within a mobile storage cluster for accessing a point-in-time image of at least a portion of data stored in a main storage cluster;
an analysis module operatively coupled to the processor to process analytic tasks based on the point-in-time image and acquired data received from a data capturing device, when the mobile storage cluster is not connected to the main storage cluster; and
an integration module to integrate the acquired data into the main storage cluster when the mobile storage cluster is connected to the main storage cluster;
wherein integration module is further configured to use differences of file system metadata between the main storage cluster and the mobile storage cluster to update a file system of the main storage cluster.

26. The data storage node of claim 25, wherein the analysis module is configured to process analytic tasks from a client device within a vehicle based on the point-in-time image and the acquired data when the mobile storage cluster is not connected to the main storage cluster.

27. The data storage node of claim 25, wherein the mobile storage cluster is a mobile Hadoop storage cluster, which is separated from the main storage cluster when the mobile Hadoop storage cluster receives the acquired data.

28. A computer implemented method, comprising:
receiving, at a data storage node of a mobile storage cluster, an analytic task from a client device;
contacting one or more other data storage nodes within a main storage cluster for accessing a point-in-time image of at least a portion of data stored in the main storage cluster; and
processing the analytic task, at the mobile storage cluster, based on the point-in-time image and acquired data from a data capturing device, when the mobile storage cluster is not connected to the main storage cluster;
removing data nodes storing the real-time acquired data from the mobile storage cluster;
integrating the data nodes into the main storage cluster; and
using differences of file system metadata between the mobile storage cluster and the main storage cluster to update a file system of the main storage cluster.

* * * * *